United States Patent [19]

Stafford et al.

[11] 3,828,325

[45] Aug. 6, 1974

[54] UNIVERSAL INTERFACE SYSTEM USING A CONTROLLER TO ADAPT TO ANY CONNECTING PERIPHERAL DEVICE

[75] Inventors: John P. Stafford; Allen B. J. Cuccio, both of Oklahoma City, Okla.; J. Arthur Johnson, Syracuse, N.Y.

[73] Assignee: Honeywell Information Systems, Inc., Waltham, Mass.

[22] Filed: Feb. 5, 1973

[21] Appl. No.: 329,491

[52] U.S. Cl. .............................................. 340/172.5
[51] Int. Cl. .............................. G06f 3/00, G06f 3/14
[58] Field of Search .................................. 340/172.5

[56] References Cited

UNITED STATES PATENTS

| | | | |
|---|---|---|---|
| 3,210,733 | 10/1965 | Terzian et al. | 340/172.5 |
| 3,267,434 | 8/1966 | Clark et al. | 340/172.5 |
| 3,283,308 | 11/1966 | Klein et al. | 340/172.5 |
| 3,419,852 | 12/1968 | Marx et al. | 340/172.5 |
| 3,475,729 | 10/1969 | Porcelli et al. | 340/172.5 |
| 3,597,743 | 8/1971 | Murphy et al. | 340/172.5 |
| 3,618,039 | 11/1971 | Baltzly et al. | 340/172.5 |
| 3,688,273 | 8/1972 | Narang | 340/172.5 |
| 3,699,530 | 10/1972 | Capowski et al. | 340/172.5 |
| 3,723,973 | 3/1973 | Kennedy | 340/172.5 |
| 3,728,693 | 4/1973 | Macker et al. | 340/172.5 |

*Primary Examiner*—Raulfe B. Zache
*Assistant Examiner*—Melvin B. Chapnick
*Attorney, Agent, or Firm*—James A. Pershon

[57] ABSTRACT

A universal interface system includes a number of identical bidirectional input and output port leads, with groups of leads being identified under program control to drive each connecting peripheral device according to the devices' procedural interface requirements. Peripheral devices are serviced at the appropriate time to accept or send data information either serially by activating one port or in parallel by activating the number of port leads required to sample all data bits at one time. Each port is addressed separately and activated for transmitting or receiving data information signals from and to a common data bus. The ports are serviced according to a priority scheme for interrupting the basic controller. Any and all interrupts can be program masked by the controller.

16 Claims, 7 Drawing Figures

PRIORITY ENCODER

UNIVERSAL INTERFACE SYSTEM USING A CONTROLLER TO ADAPT TO ANY CONNECTING PERIPHERAL DEVICE

BACKGROUND OF THE INVENTION

This invention relates generally to a data processing system and more particularly to a communication controller having universal interface input/output ports.

Since programmable terminals and peripherals today each have different operating parameters, present-day data processing systems implement the programmable terminals and peripheral controllers by using an interface adapter designed especially for each terminal and/or controller to connect to the processing unit. The processing unit uses a single common interface standard to which all peripheral devices must adapt through the use of the special interface adapter. Each peripheral device type requires special adapter logic unique to the device type to adapt it to the standard I/O interface. With this arrangement many device timing functions, i.e., synchronization to printer drum rotation, are located in the adapter logic. The parameters which define the device interfaces are the number of input and output leads; the identity of the input/output leads, that is, whether they are data, control, status or address; the mode of operation including the data interchange control procedures; whether the device is polled and/or selected; and whether data transfer is asynchronous, under interrupt control, or is clocked. The problem is compounded because of the many different peripheral devices that are needed to fill the requirements of all of the possible application areas in which the data processing system is to be used. The large number of peripheral devices creates interface problems because very few of the peripheral devices are identical or require identical signals.

PRIOR ART

In the consideration of interface requirements for a general purpose controller, the first concept is to create a single common interface standard to which all peripheral devices must adapt through the use of special device interface electronics. However, if a single common interface is to be established, a fixed value for each of the parameters must be selected. Obviously, if this is done, many devices will have to be compromised because a common interface cannot be found which exactly suits all devices. Because of the wide variety of devices, and the amount of interface electronics which must be added to the device, it is generally concluded that a single common interface is not economically feasible. The device adaptors might consist of more logic modules than a special purpose controller design.

Some prior art data processing systems included an input/output controller which provided a common location for the device level interface. The input/output controller provided a common interface to the computer but the input/output controller still required adapting devices for the peripherals.

Thus, what is needed is a controller that has universal interfacing capabilities which minimizes the amount of device electronics by adapting to the device rather than requiring that the device adapt to a common interface.

SUMMARY OF THE INVENTION

The basic logic unit or controller according to the present invention provides a procedural adaptation stage for adapting different peripheral devices by program controlling input/output ports to define the interface for the peripheral device according to the number of input and output leads required, the identity of the input/output leads, the data interchange control procedures to obtain the mode of operation, and the type of data transfer. Programs address the individual ports and activate the transmission or reception of data information by decoding the instructions in the program.

The controller adapts itself to the peripheral device interface rather than requiring the devices to adapt to the controller thus eliminating the need for special device adapter hardware. The power of the controller is used to adapt to any peripheral device interface thereby creating a universal interface. The controller programs the input/output ports as having input and/or output leads, designates the selected leads as data or control leads, and operates the leads for the information to be transmitted either in serial or in parallel. All port leads are identical. The signal parameters of these leads are firmware programmable to control the pulse widths, the signal frequencies, the signal identity, and the number of leads allocated to each peripheral device. The device electronics either internal to the peripheral device or a voltage interface unit provides the drive, voltage level and impedance compatability for the peripheral device.

Data and control signals received from the peripheral devices connected to the input leads of the I/O ports are transferred directly onto a data bus in the basic logic unit or into registers in the input/output port unit. The signals can be passed through an arithmetic and logic unit back to the data bus for transfer to storage registers. Thus, the data and control signals can be group sampled, modified and/or tested when passed through the arithmetic and logic unit, and stored in the general registers. By the usage of a common data bus in the basic logic unit, the data being transmitted to a peripheral device can be checked. Further the ports may be used as intermediate buffers by activating the ports at the same time that the data information is being received from the ports.

An interrupt system is provided to control the program addressing of the ports for servicing the ports according to the preset priority scheme. The interrupts may be selectively enabled or disabled via a program which controls or masks the servicing of the interrupts.

It is, therefore, an object of the present invention to provide an enhanced apparatus for adapting a controller unit to any connecting peripheral device.

It is another object of the present invention to provide program control apparatus which procedurally adapts peripheral devices to a controlling unit.

It is yet another object to provide program controlled input/output ports for controlling the transmission and/or receiving of data information signals from peripheral devices via bidirectional transmission leads interconnecting the port and peripheral devices.

It is still another object to provide program controlled ports wherein the programs are altered according to an interrupt priority scheme which can in turn be masked via a program stored in the controller unit.

These and other objects of the present invention will become apparent to those skilled in the art as the description of the preferred embodiment proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein.

DESCRIPTION OF THE PREFERRED EMBODIMENT

The fundamental object of the universal interface system according to the present invention is to utilize one hardware design as the controller of a series of terminal products. This one hardware design for the purposes of this description will be called the basic logic unit or BLU. The BLU is capable of being adapted to different terminal device configurations and is programmable to meet varied functional and control requirements.

Figure 1:
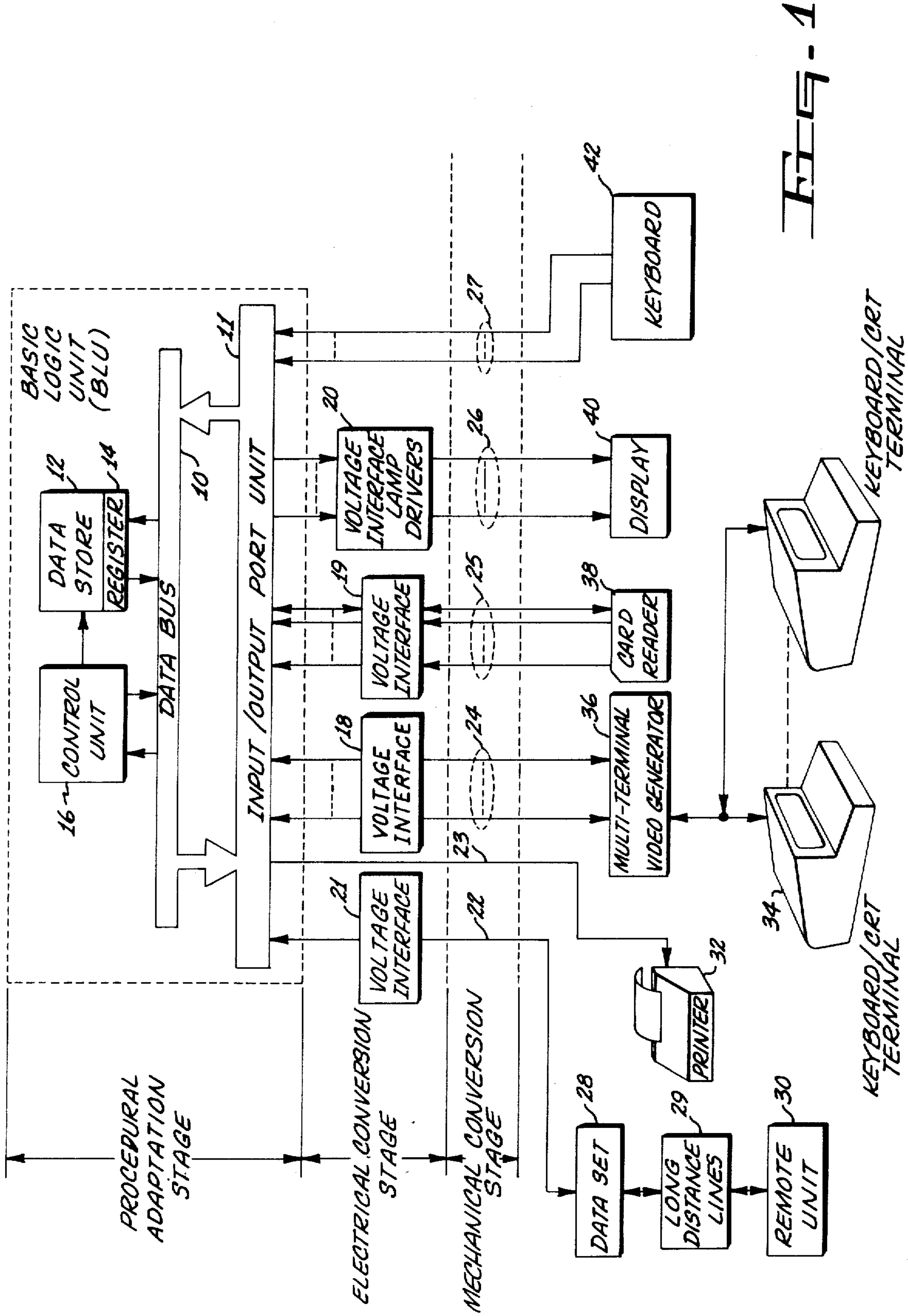
FIG. 1 is a block diagram showing the different stages for adapting a plurality of peripheral devices to a controlling unit.

As shown in FIG. 1, the BLU has a general purpose machine organization using a data bus arrangement 10 and comprises an input/output port unit 11 for controlling the transfer of data information into and out of the BLU, a data store 12 for storing the program for the functions of the different peripherals and the variable data information, registers 14 as buffers for intermediary transfer of data between the data bus 10 and the data store 12, and a control unit 16 to control the operation and execution of the different functions of the BLU. Coding stored in the data store 12 adapts the BLU hardware to the particular terminal application. This coding is referred to as firmware. The firmware is a program for controlling the operation of the different parts of the BLU, including the input/output ports 11. Thus by placing particular control programs in the data store 12, the BLU permits functional changeability with a minimum amount of device electronics to permit interfacing with a wide variety of low to medium speed terminal devices without the use of a special interface adapter.

The basic logic unit is shown in FIG. 1 attached to many different peripherals through a group of voltage interface units 18–21 and cables 22–27. In the system according to the present invention, the basic logic unit is the procedural adaptation stage adapting the data and control inputs from the peripheral devices, the voltages interface units provide the electrical conversion stage, and the cables provide a mechanical conversion stage. The universal interface function of the basic logic unit is adaptable to a variety of peripheral digital devices. For example, procedural device interface could include: single leads for control information or serial data, four leads for packed decimal or hexadecimal data, eight leads for character parallel transfer, and twelve leads for Hollerith information. The basic logic unit includes a priority interrupt mechanism for those devices whose time-critical functions require real time service. With the universal interface function of the BLU, some peripheral devices will require no special device electronics, some will need level converters, while high-speed devices may require bit or character buffers or other special device electronics for interfacing with the BLU.

A dataset 28 represents a data communication channel which operates via long distance lines 29 to connect a remote unit 30 to the BLU. The dataset 28 requires bidirectional serial data and thus is connected to only one input/output line. Generally a dataset requires connection to the voltage interface unit 21. A printer 32 is also shown connected to the input/output ports 11 of the BLU via the cable 23. The BLU determines the characters to be printed and controls the printing operation. The printer 32 could be a serial tape printer that requires 12 output leads for transmitting the data information and the print and space controls to the printer 32 and three input leads for servicing the interrupt and completion signals.

The BLU can also control a multi-station display such as a multiple keyboard/CRT terminal 34 shown in FIG. 1. This product application is an example of one which requires logic and the voltage interface unit 18 in addition to the BLU. A video signal must be generated for each CRT display. Since the BLU does not have sufficient speed to perform this function, a multi-terminal video generator 36 performs the character generation and refresh memory functions external to the BLU. The multi-terminal video generator 36 is then connected via the cable 24 and the voltage interface unit 18 to the input/output port 11 of the BLU.

The BLU can also be connected to other devices such as a card reader, a display unit 40 and a keyboard 42. Generally a voltage interface unit is used for these peripheral devices. The BLU accepts inputs from the card reader 38 and internally generates a timing strobe to read the information from the cards. The card reader 38 requires twelve unidirectional input lines of the cable 25 driven in parallel from the card reader 38 to the BLU. The timing strobe requires a bidirectional input/output lead of the cable 25 and separately controls and is controlled by the BLU. Also one input is required as an interrupt to signal that the card reader is ready for service. The operator display 40 is driven directly by the BLU through the voltage interfacing lamp drivers 20. The keyboard 42 is interfaced directly and is capable of transferring 8 bits in parallel directly to the BLU. All of the separate peripheral units can use the leads of the input/output port unit 11 in whatever fashion desired, input or output only, bidirectionally, or for data or control information. Each input/output lead into the BLU is programmable, the I/O ports by the controlling program and the individual leads by the internal logic controls.

Figure 2:
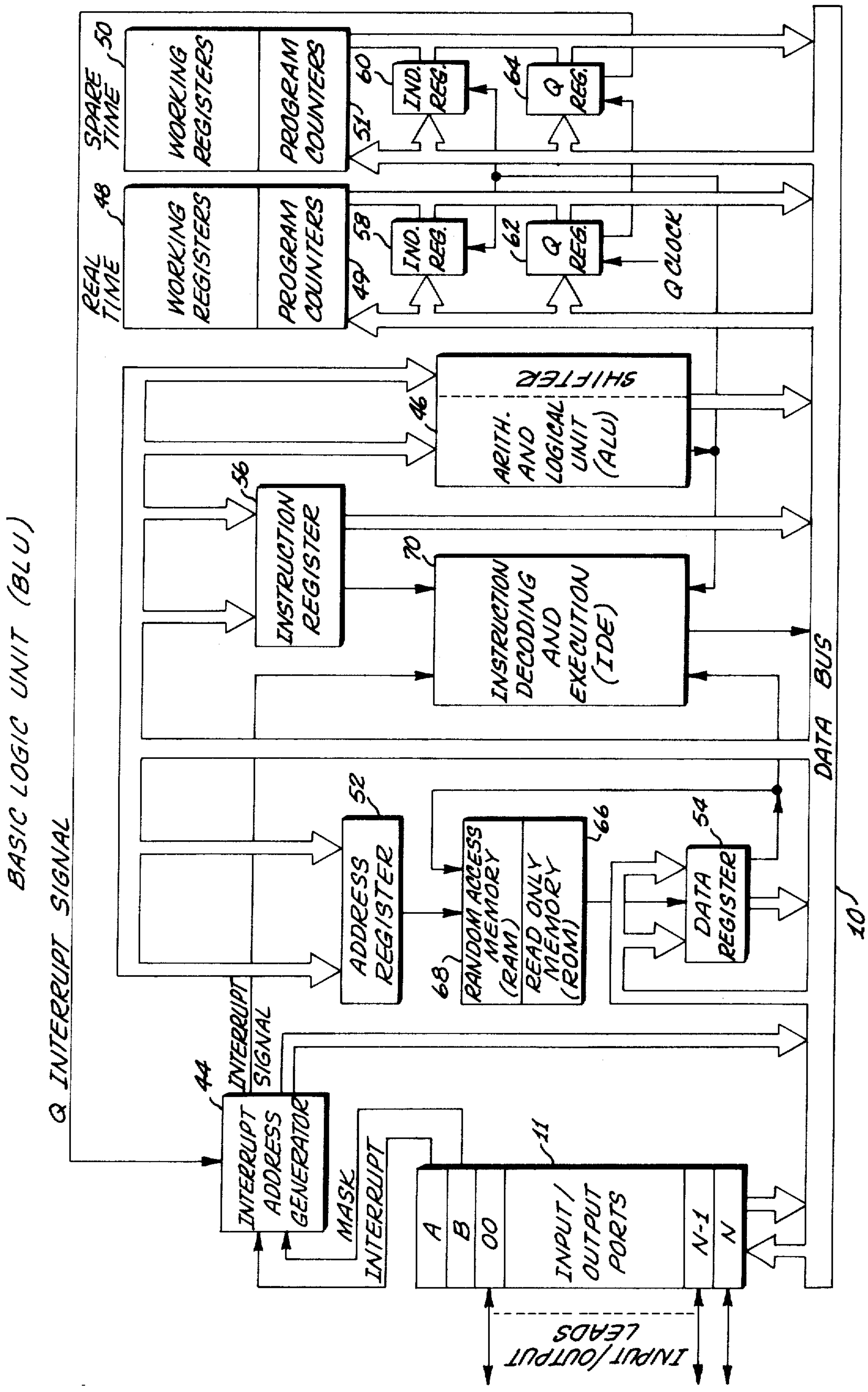
FIG. 2 is a block diagram of a controller or basic logic unit of FIG. 1 showing the interconnection of the functional units of the basic logic unit.

Referring now to FIG. 2, the basic logic unit (BLU) comprises seven basic functional units. The functional units are: the input/output ports 11, an interrupt address generator 44, an arithmetic and logical unit (ALU) 46, a real time working register 48 and a spare time working register 50, a group of general registers such as an address register 52, a data register 54, and an instruction register 56, a real time indicator register 58 and a spare time indicator register 60, and a real time queue (QR) register 62 and a spare time queue (QS) register 64, a read only memory (ROM) 66, and random access memory (RAM) 68, and last an instruction decoding and execution (IDE) unit 70. A generalized discussion of the units will be given now to show the interaction of the system.

All data transfers between the functional units are made on the 8 bit data bus 10 under the control of the instruction decoding and execution (IDE) logic unit 70. Firmware programs, with variable data stored in the combined ROM/RAM memory, are executed by the BLU to control various peripheral devices through the universal interface feature.

The I/O ports 11 interface with the data bus 10, transferring 8 bits in parallel. Each of the I/O ports 11 are individually addressed by the program. The I/O ports 11 can be described as a series of 8 bit registers connected to the data bus 10. Each of the registers can be loaded and read as determined by the program stored in the ROM 68. The I/O ports 11 therefore control the transfer of data information into and out of the basic logic unit (see FIG. 1). A more complete description of the I/O ports 11 will be given in the discussion of FIGS. 3 and 4.

The I/O ports 11 include an internal port register with each binary storage location of the port register connected to one input/output lead of one port. Each storage location is individually accessed by the IDE unit 70, and therefore each input/output lead is controllable. The port register can be logically ANDed in the arithmethic and logical unit 46 with preloaded information from any one of the working registers to control the entry of data signals into the controller.

The interrupt address generator 44 receives and interprets incoming signals whether an interrupt has been requested or not, generates a general interrupt signal INT if an interrupt has been requested, and transmits the INT signal to the IDE control logic 70. The interrupt is serviced at the completion of the current spare time instructions. The IDE logic takes the interrupt signal indicating the peripheral device requiring service from the interrupt address generator, produces the correct address for the location in the memory store of the required instruction, transfers the contents of these instructions to the real time program counter, and places the BLU in real time. The memory store, particularly the ROM, must contain the starting memory addresses of the routines which service these interrupts in the same order with which they have been assigned to the interrupt address generator. If two interrupts are awaiting service, the one with the highest priority will be serviced first.

An interrupt may be selectively enabled or committed, or disabled, that is suspended, by the program if an output port lead is connected to the appropriate masked input at the interrupt address generator. An interrupt will be processed by the interrupt address generator if the masked input is in a low state.

Interrupts may be selectively enabled and disabled by assigning an output lead as an interrupt mask. The interrupt can then be disabled by enabling the mask signal corresponding to the interrupt signal. If an interrupt is awaiting service when it is disabled, then that interrupt will be discarged by the interrupt address generator. For example, printer interrupts could be enabled only when the BLU has a message to print. An interrupt enabled by the reception of a start bit from the printer could be disabled during the reception of data and stop bits. Interrupts resulting from the reception of a receive bit would be enabled during reception and disabled during transmission. Some printers as well as some drum memory stores continually transmit interrupt signals. These interrupt signals can be masked or disabled when the controller does not require correspondence with the device. Controller time is saved since unneccessary interrupts of service are ignored. Since the interrupt address generator logic unit 44 interacts in a large extent with the I/O ports 11, a more complete description will be given later in the discussion of FIGS. 6 and 7.

The arithmetic and logical unit 46 (ALU/SHIFTER) is a combined 8 bit arithmetic unit and 8 bit shifter. The arithmetic operations include AND, ADD, exclusive OR (XOR), INCREMENT BY ONE, and ONE'S COMPLEMENT. The shifting portion of the ALU/SHIFTER is capable of shifting the 8 bits up to 7 bit positions, right or left, with zero fill or in a circular mode.

The general or working registers comprise five registers specifically called the working registers 48 and 50, the program counter registers 49 and 51, the indicator registers 58 and 60, and the queue registers 62 and 64. These registers include a real time set and a spare time set. In this way, when the machine is operating in spare time and an interrupt occurs, the contents of these registers are not saved before starting the real time service. Only the real time registers may be accessed when the basic logic unit is in the real time mode and only the spare time registers may be accessed in the spare time mode.

The working registers are general registers whose content may be shifted right or left, combined logically or arithmetically with data information from the memory store, tested on a character or bit basis, used in input/output operations, transferred to or from, or compared. The contents of the working registers may be added to the memory address word of the instruction to modify the instruction. The result is an effective memory address value used in instruction execution which is variable by modifying the contents of the working register. The working register also has the additional special purpose of masking I/O ports information transfers as described previously.

Two program counter registers 49 and 51 control the instruction sequence, one during real time and one during spare time. The data information stored in the program counter register is the memory address of the next instruction to be executed. The IDE logic unit 70 transfers the contents of the program counter register, either 49 or 51, to the address register 52, then updates the program counter register information. The indicator registers 58 and 60 store the information reflecting the status of the hardware indicators for interrupt, carry, zero/non-zero, and odd/even.

The real time and spare time queue registers 62 and 64 are used as an internal, variable timing source. These two registers are combined to form a counter which is decremented by the clock pulses of the controller. An interrupt is generated when the counter is equal to zero. The queue registers can be modified to adjust the timing of the next interrupt.

The memory in the basic logic unit comprises the read only memory (ROM) 66 for instructions and constant data, combined with the random access memory (RAM) 68 for variable data. The address register 52 holds the address that is used during the next memory cycle and obtained from the data bus. The address register 52 addresses both the random access memory 68 and the read only memory 66. The data register 54 acts as a buffer register between both memory units to the data bus 10. The data register 54 is also capable of taking data information from the data bus 10 and transferring this information into the random access memory 68.

The random access memory 68 is a modular read/write memory with a nondestruct read cycle. The read only memory 66 is a modular read only memory which is coded with the program instructions used in controlling the operation of the basic logic unit at the time of fabrication.

The instruction decoding and execution (IDE) logic unit 70 functions can be classified in terms of six operations, each one being a sequence of micro-steps. The six operations are: an interrupt test, an instruction fetch, an address fetch, a data fetch, an execute, and a data store. The IDE logic unit 70 is the control unit of the machine. The function of the IDE logic unit 70 is to perform the elementary control operations that are necessary to fetch, decode and execute the high-level instructions stored in the combined ROM/RAM memory. This hardware generates "FROM" and "TO" addresses for all other functional units for transfer of data to or from the data processor. In addition, the IDE logic unit generates the ALU/SHIFTER controls and contains the controlling logic for servicing the interrupts.

An instruction cycle in the IDE logic is as follows: first, an instruction is read by transferring the information in the program counter register to the address register, the value of the program counter is then updated with a new instruction from the IDE unit 70; second, the instruction is executed from the instruction register and the data register; third, execution could include one or more of the following — another memory read or a memory write, a transfer to or from any of the registers, a transfer to or from any one of the ports, a shift, add, or logical operation through the arithmetical and logic unit, a modification to the indicator register, or a set or reset of the IDE flags and indicators; and fourth, servicing of the interrupt which may only occur at the end of an instruction cycle. The servicing of the interrupt is controlled by the IDE logic, that is, the IDE logic switches to operate with the real time registers, loads the real time program counters, and starts the execution of the appropriate interrupt service routine. The indication of the request for an interrupt is stored in the indicator register.

The inputs to the basic logic unit from the peripheral devices are through the input/output port functional unit 11. The input/output or I/O ports 11 accept and present information and control data to the various peripheral devices. In the present embodiment, the I/O ports 11 are hardware modularly added in groups of five. The I/O ports 11 interface with the data bus 10, eight bits in parallel. Each of the ports can be individually addressed by the firmware program and loaded from or read to the data bus 10. The I/O ports 11 can be thought of as a series of 8 bit port registers connected to the data bus 10 which can be loaded and read. A single I/O port must contain either all input leads or all output leads. Otherwise, lead definition is completely flexible. One of the ports is a special interrupt port (port A) and has an interrupt detector on each input to that port. Port A effectively receives and stores the indication from either the peripheral device or the IDE logic that one or more of the peripheral devices requests or requires service. Port B can be program controlled by the IDE logic unit 70 to mask or inhibit any interrupt. The interrupt feature will be discussed in more detail later in the discussion of the interrupt address generator 44 of FIGS. 6 and 7.

Figures 3, 5:
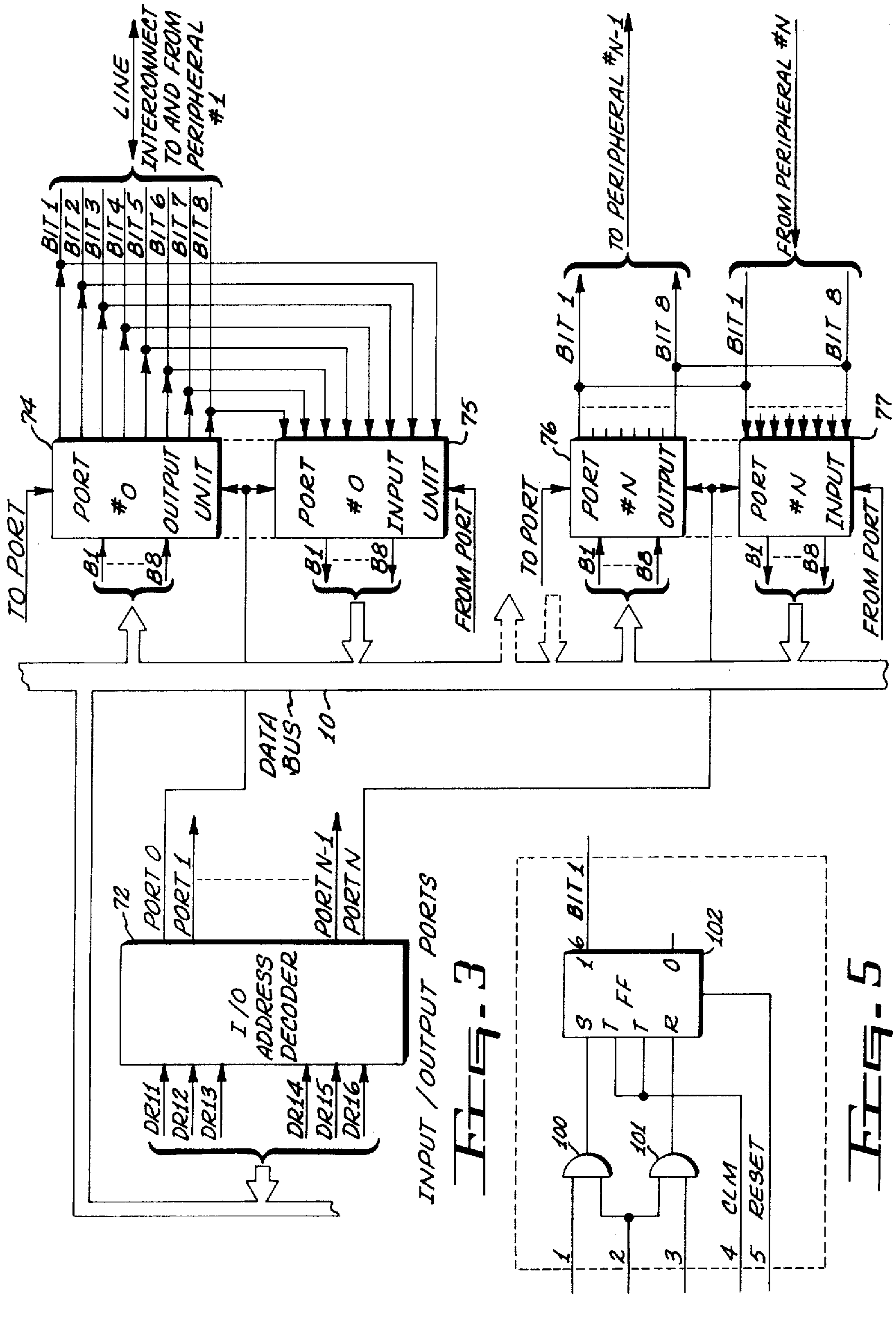
FIG. 3 is a block diagram of the input/output port unit shown in FIG. 2.
FIG. 5 is a logic diagram showing the logic internal to a port as shown in FIG. 4.
Figure 4:
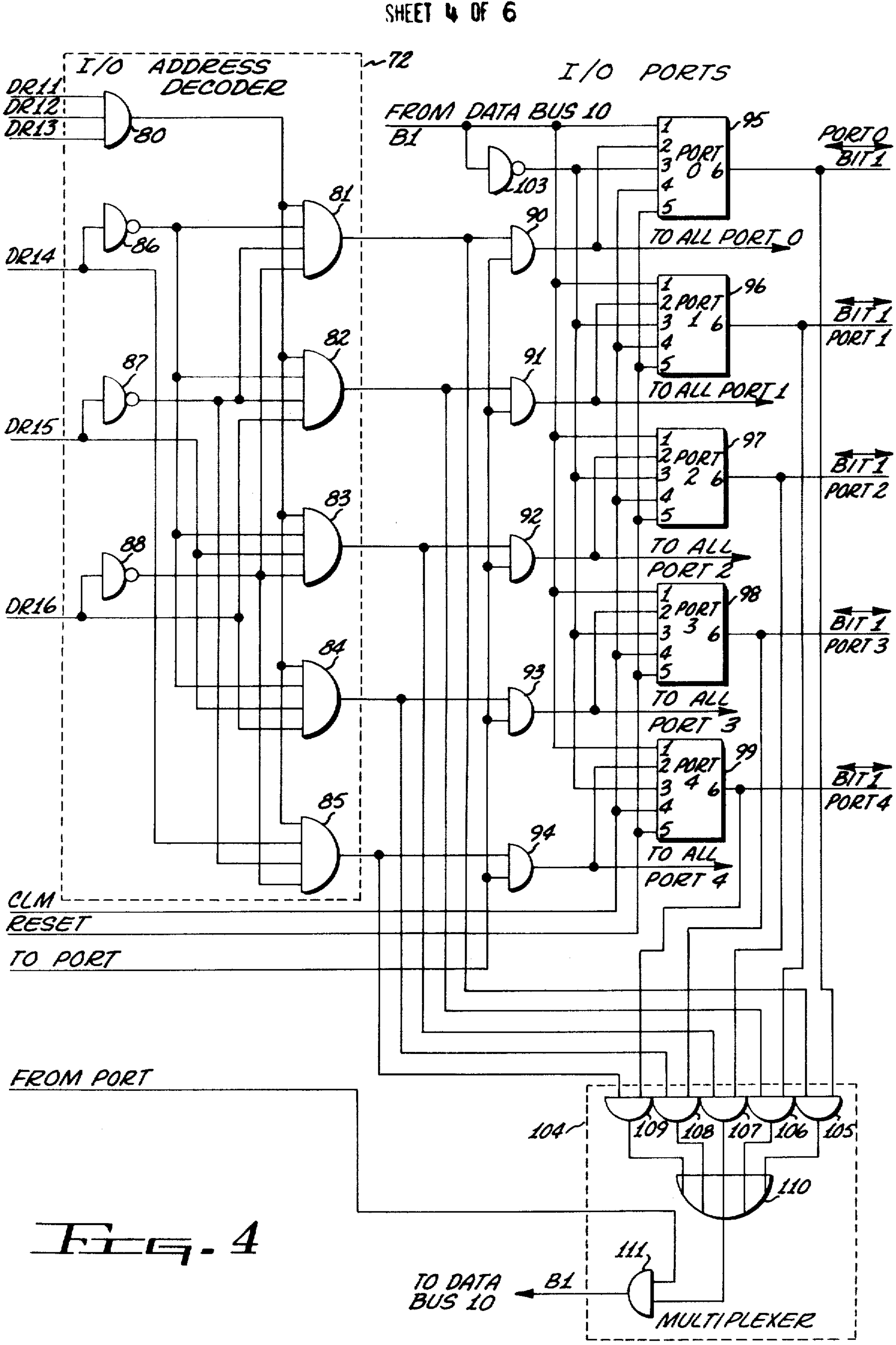
FIG. 4 is a logic diagram showing the portion of the logic and control of one bit of data information for several ports.

A block diagram of the input/output ports 11 according to the present invention is shown in FIG. 3. A logic diagram for a portion of the input/output ports 11 is shown in FIG. 4.

Referring now to FIG. 3, the I/O ports comprise an I/O address decoder 72 for activating a particular port, an output unit 74 and 76 in each port for controlling the transfer of data information to the peripherals, and an input unit 75 and 77 in each port for controlling the inputting of data information from the peripherals to the basic logic unit. Two ports, port No. 0 and port No. *n* are shown on FIG. 3 representing that any number of I/O ports can be attached to the basic logic unit, depending only on the addressing signals used to activate a particular port.

The address selection according to the preferred embodiment is taken from the data registers, DR11 through DR16 in particular. Two instructions, input INP and output OUT, are used to activate the I/O ports. These instructions are obtained from the read only memory 66, transferred to the data register 54, and then, via the data bus 10, directed to the I/O ports 11 (see FIG. 2). The address decoder 72 takes the information from these data register inputs and activates a particular port. The data register inputs are shown as DR11–DR16 signals to show the origination but these inputs are bit information signals B1–B8 from the data bus 10 as are any signal removed from or placed on the data bus.

To transmit information from a particular port, the data information is transmitted from the memory store, either the RAM or the ROM, to the data register and via the data bus to the output unit as bit information signals B1–B8. Thus if port No. 0 is activated, the data information is transmitted from the data bus into registers located within the port 0 output unit 74. The "TO PORT" signal is then activated by the instruction decoding and execution (IDE) logic and the data information is transmitted from the port No. 0 output unit 74 to become the bit 1 to bit 8 signals transmitted to peripheral No. 1.

As shown in FIG. 3, the ports may be connected in any one of several different formats. For instance, port 0 input unit 75 and output unit 74 are connected together such that data information can be transmitted to and from the peripheral No. 1. Port N, however, has its output unit 76 connected to peripheral No. N minus one and its input unit 77 connected to a different peripheral, peripheral No. N. Port 0 could be connected to the keyboard/CRT terminal 34 shown on FIG. 1, for example, and port N output could be connected to the display terminal 40 with port N input connected to the keyboard terminal 42. The basic logic unit may have all output leads and no inputs or all inputs and no outputs or any combination in between. Several ports may also be connected to one peripheral if necessary in order to implement the transfer of data to a particular peripheral device. For instance, the card reader requires twelve parallel input data lines and thus the leads from two ports could be used to cover all of the data and control leads. Thus the basic logic unit is very flexible depending only on the programs stored in the memory units.

To continue with the operation of port No. 0, if data information is to be transmitted from peripheral 1 into the basic logic unit, the data information, bits B1 thorugh B8 are transmitted into the port No. 0 input unit 75. The "FROM PORT" signal is then activated by the IDE control unit and the data information from the port No. 0 input unit 75, B1–B8, is then directed to the data bus 10 into one of the registers, depending upon the register selected by the IDE logic unit. It is, of course, obvious that the address decoder 72 must have activated the port 0 via the data register DR signals in order to allow the transfer of data information from the peripheral onto the data bus 10.

FIG. 4 shows the schematic for the input/output port. The input/output ports are modularly added to the basic logic unit in, according to the present invention, groups of five. The I/O ports interface with the data bus, 8 bits in parallel. Each of the ports can be individually addressed by the program instructions stored in ROM and can transfer data from or read data information to the data bus. The I/O ports can be thought of as a series of 8bit registers connected to the data bus. These port registers could be used as additional storage registers if the application warrants.

At the device or output side of the ports, the side that interfaces with the device electronics, the I/O ports appear as an interface with individual I/O leads. Each of these individual leads can be used as either an input or an output, as determined by the firmware program which activates the port to either take the information from the I/O leads or to load information into a selected port to transfer information to the I/O lead.

In FIG. 4, a portion of the logic for the input/output ports 11 is shown. In this circuitry the address decoder 72 is controlling five ports, port 0 to port 4, for the transfer of 1 bit of information, bit 1. Thus for the five ports shown, each port has seven similar circuits to accomplish the transfer of all 8 bits to and from the peripheral unit. Likewise if more than five ports are to be needed, another complete section can be added using a different combination of the data register signals, DR11–DR16, to accomplish the activation of the different ports. The decoder therefore as shown in FIG. 4 can be used to drive many more ports.

Three data register signals DR11, DR11 and DR13, along with the other data register DR14, DR15 and DR16 signals activate the entry of data information into ports 0–4. The DR11, DR12 and DR13 signals are directed to an AND-gate 80 whose output is directed to five output AND-gates 81–85 from the address decoder 72. The other inputs to the output AND-gates 81–85 are selectively controlled by the DR14, DR15 and DR16 either high or low signals. For instance, the first AND-gate 81 will be activated upon the concurrence of the DR11, DR12 and DR13 signals along with the DR14, DR15 and DR16 signals all directed to the first output AND-gate from inverters 86, 87 and 88, respectively, connected to these data register signals. If the port 0 is to be enabled the inverted signals will be high enabling the first output AND-gate 81.

The first output AND-gate 81 from the address decoder 72 is directed to an AND-gate 90 whose other input is controlled by the TO-PORT signal. When the TO-PORT signal is activated by the IDE logic, the port 0 will be activated to store the B1 information bit. Likewise the remaining group of AND-gates 91–94 will, when activated by its address decoder AND-gate 82–85, respectively, enable the storage of the B1 information into the port selected.

Each of the port circuitry blocks 95–99 shown in FIG. 4 include logic circuitry, see FIG. 5, comprising two AND-gates 100 and 101 and a flip-flop 102. The input numbers shown in FIG. 4 correspond to the same input numbers shown in FIG. 5. Referring to FIGS. 4 and 5 and continuing with the explanation of the port 0, information bit 1, the output of the AND-gate 90 is directed to the number 2 input to port 0. This AND-gate 90 is also connected to the same input to all of the port 0 logic blocks. The activation of the AND-gate 90 activates one leg of each of the AND-gates 100 and 101 in the port 0 block, see FIG. 5. The information bit signal B1 is directed into the one input leg which is one input to the first AND-gate 100. The information bit B1 signal is also directed to an inverter 103 whose output is directed to the number 3 inputs to all of the ports controlling the B1 information bit signal. The number 3 input is connected to the input to the second AND-gate 101. The output of the first and second AND-gate 100 and 101 in the port 0 block 95 is directed to the set and reset inputs respectively to the flip-flop 102. The trigger inputs to the flip-flop 102 are controlled by the master clock CLM signals. Thus upon the activation of the CLM clock signal, the flip-flop 102 is activated according to the state of the B1 information bit signal. The set or "1" state of the flip-flop 102 becomes the port 0 bit 1 data information transmitted to the peripheral connected to port 0.

The leads connected to the peripherals are bidirectional leads. The data information can be transmitted out to the peripheral as just described or the data information from the peripheral can be directed into the port via the same lead. Incoming data information is transmitted along the port 0 bit 1 lead into the I/O ports and on into a multiplexer circuit 104 shown at the bottom of FIG. 4. The multiplexer circuit 104 accomplishes the transfer of a group of incoming bit information for the transfer of one B1 data information signal to the data bus 10. The multiplexer circuit 104 is the logic circuit that performs the transfer and is represented in FIG. 3 by the bus lines running to and from the port signals.

The multiplexer 104 comprises a group of AND-gates 105–109 whose outputs are all directed to an OR-gate 110. One leg of each of the AND-gates 105–109 is connected to the bidirectional lead going to and from the bit 1 signal lead to peripheral device. The multiplexer 104 shown in FIG. 4 could accept the bit 1 data information signal from five separate peripheral units or less depending upon the interconnection between the I/O port of the basic logic unit and the peripheral unit. The second leg of each of the group of AND-gates 105–109 is activated by the respective port address signal from the output AND-gates 81–85 of the address decoder 72. Only the AND-gate in the multiplexer for the selected port will be activated by the address port signal. The output of the OR-gate 110 in the multiplexer 104 is directed to an AND-gate 111. The second leg to the AND-gate 111 is controlled by the FROM PORT signal. Thus when the FROM PORT signal is activated, the information bit signal coming in from the selected port is transmitted into the basic logic unit on the data bus 10. The B1 information signal labeled as being from the data bus 10 directed to the input to the port circuits and the B1 information signal labeled as being directed to the data bus 10 from the multiplexer 104 is the same lead. The designations were placed in separate locations for ease of explanation only.

One port cannot accept input data at the same time the port is transmitting data. However, by activating the multiplexer 104, while the data information is being transmitted, the logic circuitry shown could be used as a wrap-around checking feature to check the data being transmitted to the peripheral devices.

An external device, interfacing with the I/O ports of the basic logic unit, may require several ports for the control of the external device or, if the device does not require the usuage of all eight of the I/O leads from a single port, one port may contain leads for more than one external device. In most applications, some ports will be split with some of the leads to one device and the remaining leads to a second device. Because of this, the instructions INP (input) and OUT (output), which instructions control the operation to read and write port data, have been implemented with a masking capability which permits access to only that portion of the I/O port which is required for its operation. The INP and OUT instructions specify and activate the particular port that requires access and any register to be used as a port register, to either transfer the data information into, if an INP instruction is activated, or to remove data information from, if an OUT instruction is activated. Both of these instructions use the working register as an I/O mask. The INP and the OUT instruction cause binary data signals to be transmitted into the working register. The data signals are selected to either allow or disable entry of specific signals stored in the port register. The allowance of specific signals can be performed by using the logic AND capability of the arithmetic unit. Placing binary 1 signals in the working register will cause the corresponding binary signals ANDed with the binary 1 signals to be allowed entry into the basic logic unit. Conversely, binary 0 signals will disable entry of corresponding signals. Thus, since specific input/output leads use the data bus for distribution through the basic logic unit and since the arithmetic and logic unit also uses the data bus for entry into or exit from the logic circuitry of the arithmetic unit, the enabling and disabling of data signals effectively enables and disables specific input/output port leads.

The performance of logical functions, such as the AND function mentioned, by an arithmetic and logical unit is well-known in the art. The exact logic configuration is not believed to be necessary for the explanation of the enabling and disabling of specific input/output port leads. A simple AND-gate might be used to perform the function described. Reference is made to a copending patent application Ser. No. 329,805, filed on Feb. 5, 1973, which fully describes an arithmetic and logic unit which can be used with the present invention.

Figure 6:
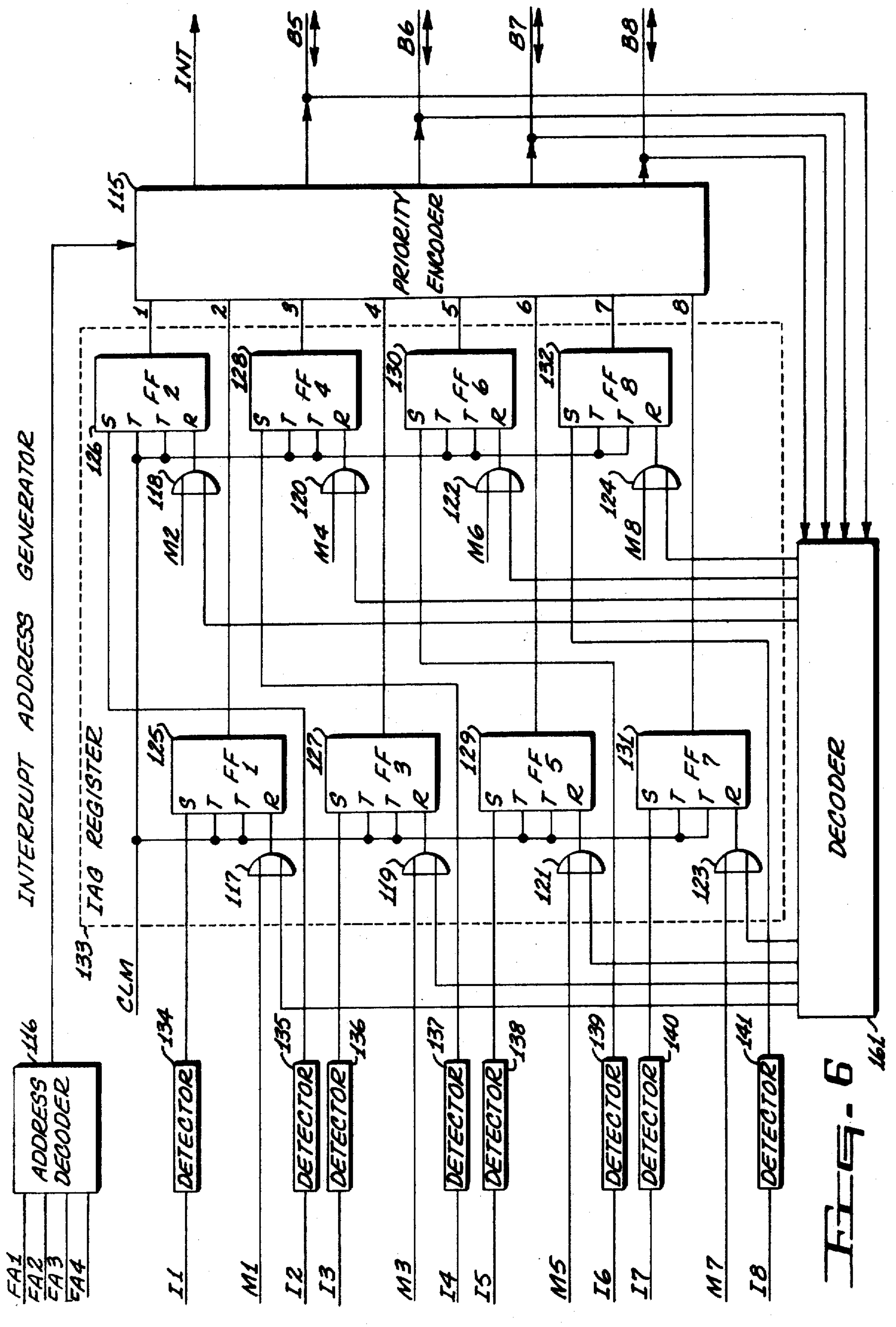
FIG. 6 is a block diagram of an interrupt address generator as shown in the block diagram of FIG. 2.

The interrupt address generator logic 44 according to the present embodiment and partly shown in FIG. 6 accepts up to 16 interrupt input signals and detects and stores for each input the fact that an interrupt signal has occurred. At the time of the occurrence of any interrupt input signal, I1–I8, the interrupt address generator logic 44 via a priority encoder 115 transmits a general interrupt signal to the IDE logic unit 70. The IDE logic unit generates a unique "FROM ADDRESS" FA1–4 signal for transmission to the interrupt address generator 44. The FA1–4 signals are shown directed to an address decoder network 116. The address decoder network 116 accepts the proper FA1–4 signals and activates, that is, releases the inhibiting of, the priority encoder 115 logic circuitry.

Figure 7:
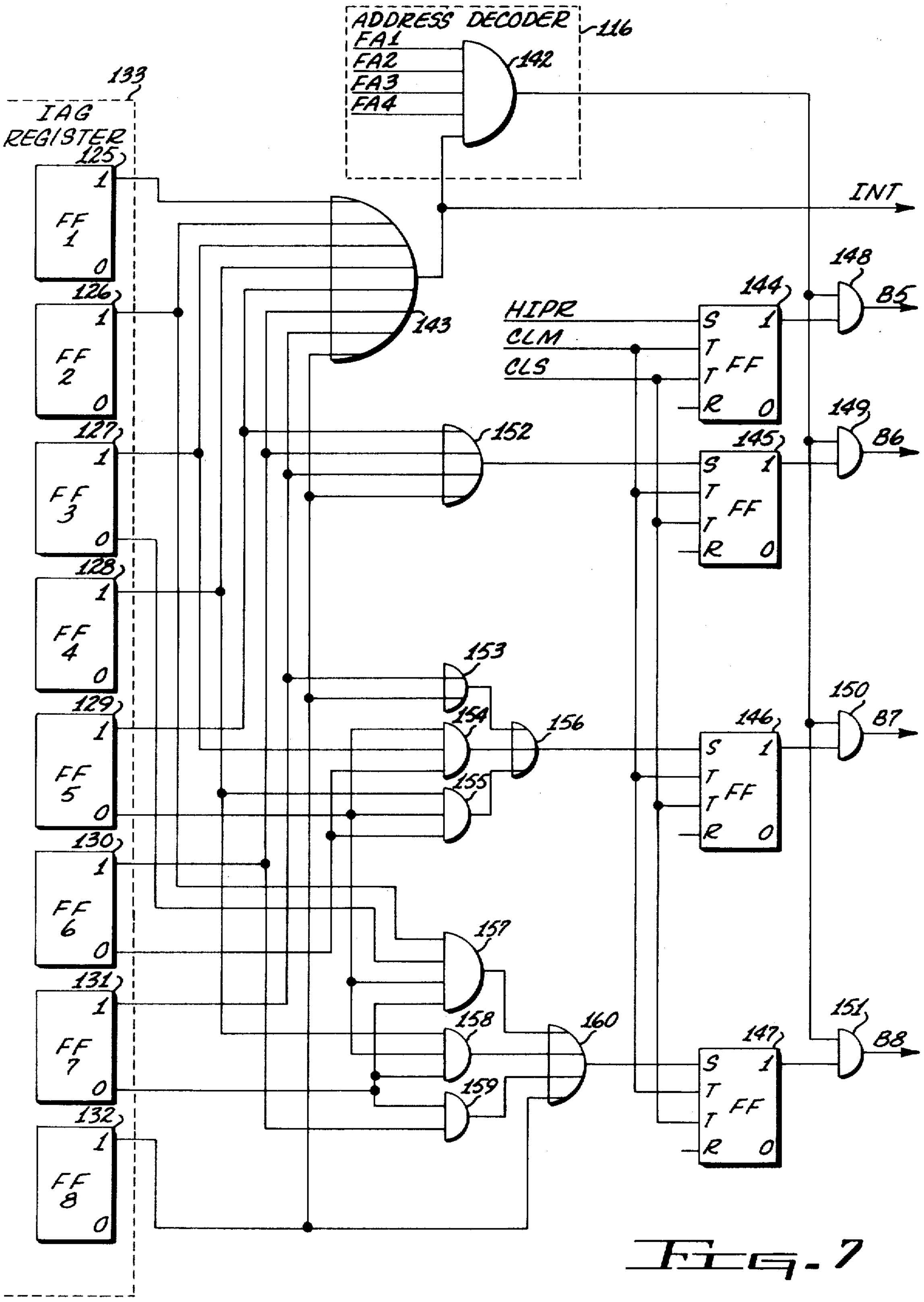
FIG. 7 is a logic diagram showing the priority encoding feature of the interrupt address generator of FIG. 6.

The interrupt address generator 44 via the priority encoder 115 generates an interrupt address value to the data bus corresponding to the interrupt that occurred and is the next interrupt to be serviced. In the embodiment being described, service to a peripheral is according to a preselected rank. Some peripherals require immediate service and thus have a high rank, while others can wait or are controlled via the I/O port and thus data is not transmitted until its rank in line is reached. The priority encoder selects the peripheral to be serviced according to the preselected rank. A logic circuit for use in the priority encoder is shown in FIG. 7.

Four data bits, B5–B8, are shown generated by the priority encoder 115. Similar circuitry to that shown in FIGS. 6 and 7 develops the data bits B1–B4 for transmission to the data bus line. The interrupt address value generated by the priority encoder 115 at its output is used by the IDE logic unit as a portion of a memory address corresponding to the first sixteen locations of the last word page of memory store. These 16 words contain the starting addresses of the real time routine which service the 16 possible interrupts. The IDE logic unit then uses the interrupt address value to reach the corresponding memory location, transfer the content of that work to the real time program and counter, and places the BLU in the real time mode for execution of the indicated real time program.

An interrupt condition is serviced at the completion of the current spare time instruction or after an interrupt return (IRT) instruction is executed in real time. The IDE control logic uses the interrupt address value to read the corresponding memory location, transfers the content of that word to the real time program counter, and places the basic logic unit in the real time mode for execution of the indicated real time program. If more than one interrupt is awaiting service, then the one assigned the highest value 0 to 15 will be serviced first, independent of the order in which the interrupts occur.

Still referring to the logic circuitry for the interrupt address generator 44 of FIG. 6, the interrupt signals I1–I8 are detected by a group of detectors 134–141 and stored in a corresponding flip-flop 125–132 of an interrupt address generator register, IAG register 133.

The interrupt address generator 44 has additional inputs called mask signals M1–M8 which are used to disable interrupt inputs received from specific peripheral devices. Interrupt signals may be selectively enabled or disabled by connecting one of the I/O leads to the interrupt mask inputs. The mask signals are generated by the IDE unit and are directed to the I/O port unit to be sampled via port A by the interrupt address generator 44. The mask signal may be programmed by the instruction being serviced by the controller such as to mask the continual interrupt signals received from a printer when data information is being transmitted to the printer. Or, specific inputs might be masked by connecting the mask input to a voltage source. This could be useful during repair or maintenance of the peripheral without disconnecting the peripheral.

In FIG. 6, the masking signals, M1–M8, are shown directed to one input to a group of OR-gates 117–124 in the IAG register 133. The output of the OR-gates 117–124 is directed to the reset or disabling input to the flip-flops 125–132 comprising the IAG register 133. Thus if an interrupt signal I1 is received at the input to the detector 134, the flip-flop 125 connected to the output of the detector 134 is then enabled. The interrupt can then be enabled or disabled by controlling the output level of the M1 lead via the OR-gate 117. If an interrupt is awaiting service when it is disabled, that interrupt will be discarded by the interrupt address generator 44. For example, printer interrupts may be enabled only when the BLU has a message to print. The printer continually generates interrupts which are disabled if there is no message to be printed or when the printer is not ready to receive a message, thereby preventing interrupts from unnecessarily slowing machine operation.

Referring now to FIG. 7, the priority encoder 115 selects the highest valued interrupt of these eight interrupts and generates an address using the bit information signals B5–B8 encoded according to the highest interrupt received by the interrupt address generator 44. The other eight interrupts for a total of 16 possible interrupt signals are generated by a corresponding interrupt address generator exactly the same as the disclosed circuit. The corresponding interrupt address generator generates the address signals for the B1–B4 bit information signals to the data bus. The interrupt signals inputs to the corresponding interrupt address generator have a higher priority than the one shown since in the embodiment being described, the higher the interrupt number, the higher the priority rating. The H1PR signal is enabled if an interrupt is stored in the corresponding interrupt address generator. The H1PR signal effectively disables all interrupts from the priority encoder shown in FIG. 7. The B1–B4 and B5–B8 data information signals are transmitted to the IDE logic via the data bus for the generation of the complete program instruction to control the input/output ports.

The set or "1" outputs of the flip-flops 125–132 of the IAG register 133 are directed to an OR-gate 143. The OR-gate 143 generates a general interrupt signal INT when any one or more interrupt signals are received by the interrupt address generator. The set and reset outputs of the flip-flops 125–132 are selectively applied to a series of logic gates 152 to 160, both AND and OR gates, which comprise the priority selection. Priority selection systems are well known in the art and thus the logic circuit shown is merely exemplary of systems that could be used.

The flip-flops 125–132 along with the logic gates 152–160 and the H1PR signal from the higher priority unit control the activation of output flip-flops 144–147 to generate the particular part of the address signals, B5–B8, transmitted to the IDE unit. The interrupt signals stored in the IAG register flip-flops 125–132 determine the state of the B5–B8 signals transmitted to the data bus.

The outputs of the flip-flops 144–147 are directed to a group of AND-gates 148–151 which have one leg of each controlled by an AND-gate 142 in the address decoder 116. The outputs of the AND-gate 148–151 are directed to the B5–B8 data lines respectively in the data bus. The signals representing the interrupt having the highest priority are transmitted to the data bus upon the activation of the AND-gate 142 of the address decoder 116 by the FA1–FA4 signals generated by the IDE logic in response to the INT signal.

After the address of the highest priority interrupt signal has been serviced, that interrupt signal is then cancelled. The interrupt signal is cancelled by resetting the particular flip-flop in the IAG register 133 storing the interrupt signal. Referring to FIG. 6, the address signals B5-B8 are directed to a decoder network 161 having its outputs directed to the OR-gates 117–129 connected to the reset input of the IAG register flip-flops 125–132. The decoder is a standard binary four input-to-ten output circuit of which eight outputs are used. The IDE logic services the interrupt by generating the interrupt address value corresponding to the I/O port that is to be activated. This interrupt address value is sensed by the decoder network. The decoder network in turn transmits a signal to reset the IAG register flip-flop storing the interrupt request being serviced via one of the OR-gates 117–124.

Referring again to FIG. 2, the queue registers 62 and 64 together with the IDE logic unit 70 and the I/O port unit 11 can be used as a means of generating an interrupt to provide interval timing when a peripheral device does not supply the needed timing signals. The device adapters in prior art applications would supply a timing signal unique to the peripheral device. Data information comprising a count is loaded into the queue register by the IDE unit in accordance with an address supplied by the interrupt address generator. The address can contain specific information to be transferred to the queue register as a specific count locating the time for the next interrupt to service the same peripheral device again. The IDE unit can set the queue register to interrupt the other programs being performed by the IDE unit after any given interval of time. This capability is especially useful with asychronous communication interfaces. The timing can be supplied by the internal program of the BLU rather than the interface adapter. The queue register provides a programmable rather than a fixed timing.

The queue register can also be used to control the pulse width and signal frequency of the data information bit signals being received by an input/output port lead. Since the queue register can be loaded with any count amount by a program instruction, data information such as serial signals can be sampled and controlled by programming a count to be placed into the queue register such that, when decremented, the center of the data information bit signal can be sampled at appropriate times and selectively placed into a register for storage until a complete signal has been received. For instance, upon receiving an interrupt signal from the peripheral device such as a dataset, a count is gated into the queue register from the instruction read from memory according to the interrupt signal received. The queue register is decremented and, upon reaching zero, generates a Q interrupt signal which is sampled by the interrupt address generator. The interrupt address generator 44 generates an address which is used by the IDE unit 70 to extract the next instruction from the memory store. The instruction provides the necessary commands to sample the correct input/output port and the correct leads in the port. The next serial data information bit signal is then sampled and transferred into a register. A count is placed into the queue register representative of the time for the next serial data information signal. This is continued until a stop information is received.

The sampling of data signals is possible with a peripheral device that transmits data at a low speed relative to the operation of the controller such as the dataset. The dataset generally transmits data at a line speed of approximately 5 kilo hertz while the controller can operate in the mega hertz range. The controller can perform many data processing steps before the dataset is ready with a succeeding bit signal. By using the queue register during transmission of data signals to the dataset, the frequency of the data signals can be selectively controlled by permitting an interrupt by the queue register at the appropriate time depending upon the frequency desired and the decrementing cycle time of the queue register. The port unit can be activated to change the data signal on one lead only via one flip-flop of the port register at the time specified by the queue register. The port lead changes relative position either high or low or not depending upon the data signal to be transmitted. This change or changeable time delineates the frequency of the transmitted data signal.

Thus, what has been shown and described is a basic logic unit which can perform as a universal interface system that can adapt its input/output port units and the leads comprising each unit to adapt via program control according to the various peripheral devices' procedural interface requirements. Upon the receipt of an interrupt signal by the interrupt address generator that a particular peripheral device is ready to receive or transmit data, a particular instruction in the memory store is activated by the IDE logic. The instruction activates the necessary logic to decode whether the data information is to be transmitted into the basic logic unit or to be transmitted from the basic logic unit to the peripheral device. The instruction also activates one or more of the input/output port units, the number being determined by the type of peripheral connected to the basic logic unit. The instruction also transfers binary data signals into the working register. The incoming or outgoing data information signals are combined with the data information signals stored in the working register in he arithmetic and logic unit to enable and disable specific ones of the data information signals either received or to be transmitted. Thus only specific leads, any one or all, of any one or more input/output ports are activated to accept the data information signals from the peripheral to the basic logic unit or to transfer data information signals from the basic logic unit to the peripheral device.

While the principles of the invention have now been made clear in an illustrated embodiment, there will be made obvious to hose skilled in the art many modifications of structure, arrangement, proportion, the elements, materials and components, used in the practice of the invention, and otherwise, which are particularly adapted for specific environments and operating requirements without departing from these principles. The appended claims are, therefore, intended to cover the embrace any such modifications, with limits only of the true spirit and scope of the invention.

We claim:

1. In a data processing system including a plurality of peripheral devices and a controller for providing a procedural adaptation stage for the peripheral devices and for receiving, processing and transmitting data signals to said peripheral devices, said controller comprising:

an instruction decode unit for depending instruction signals upon activation and responsive thereto to issue a plurality of command signals;

a port unit including a plurality of input/output ports and a port register, each port having a plurality of bidirectional leads, selective groups of leads from one or more ports interconnecting said port register to each peripheral device, each of said plurality of input/output ports selectively activated by a first of said plurality of command signals to store the data signals in said port register for the peripheral device;

an interrupt address generator connected to said port unit for generating an instruction signal representative of requests by the peripheral devices for access to the controller in response to a second of said plurality of command signals;

a counter receiving a third of said plurality of command signals from said instruction decode unit to load said counter, said counter counting set time signal pulses and generating an interrupt signal upon reaching a selected count;

said instruction decode unit responsive to the interrupt signal to decode the instruction signal from said interrupt address generator to issue the first command signal to transmit the data signals from said port register to the peripheral device and to store the third command signal in said counter;

a memory store having addressable storage locations responsive to address signals for delivering data and instruction signals stored therein, said interrupt address generator generating said address signals for the retrieval of the data and instruction signals;

a working register connected to store a portion of the instruction signal from said memory store; and means connected to receive data signals from said memory store and to receive the portion of the instruction signal from said working register and responsive thereto to perform logical functions therewith and obtain resultant signals therefrom upon activation by a fifth of said plurality of command signals;

said resultant signals being directed to said port register to transmit said resultant signals from the input/output ports activated by said first command signal for transmission as data signals to the peripheral devices, said instruction decode unit generating said first and fifth command signals to activate or deactivate certain of said bidirectional leads of said input/output ports by the resultant signals.

2. A data processing system as defined in claim 1 wherein said instruction decode unit is responsive to the interrupt signal to decode unit is responsive to the interrupt signal to decode the instruction signal from said interrupt address generator to issue a fourth of said plurality of command signals to activate said port unit and selected input/output ports to accept data signals into said port unit from the peripheral device connected to the selected input/output ports for usage by the controller.

3. A data processing system as defined in claim 1 wherein said counter is a decrementing counter and the interrupt signal is generated when said counter reaches a count of zero.

4. A data processing system as defined in claim 1 wherein means is an said arithmetic and logical unit connected to receive data signals from the input/output ports activated by said first command signal, said arithmetic and logical unit in response to the fifth command signal performing logical functions on the data signals from said input/output port in combination with the instruction signals from said working register to obtain a second resultant signal therefrom, said instruction decode unit through the instruction signal and the arithmetic and logical unit effectively obtaining the second resultant signal wherein certain of the data signals are selectively activated or deactivated by said arithmetic and logical unit thereby activating or deactivating certain of the bidirectional leads in the activate input/output ports according to the insruction signal, said resultant signals being directed to a storage register for usage by the controller.

5. A data processing system as defined in claim 1 wherein said interrupt address generator of said controller further includes a means for selectively masking thereby disabling selected ones of said request signals to prevent the generation of an interrupt signal resulting from said masked request signals.

6. In a data processing system including a plurality of peripheral devices and a controller for providing a procedural adaptation stage for the peripheral devices and for receiving, processing and transmitting data signals to said peripheral devices, said controller comprising:

a memory store having addressable storage locations responsive to address signals for delivering data and instruction signals stored therein;

an instruction decode unit for decoding instruction signals received from said memory store and responsive thereto to issue a plurality of command signals;

a port unit including a plurality of input/output ports and a port register, each port having a plurality of bidirectional leads, selective groups of leads from one or more ports interconnecting said port register to each peripheral device, each of said plurality of input/output ports selectively activated by a first of said plurality of command signals to transfer data signals in said port register to the peripheral device;

an interrupt address generator connected to said port unit to receive and detect request signals representative of request by the peripheral devices for access to the controller and responsive thereto to generate an interrupt signal for interrupting a process being performed by the controller and to generate an address signal to said memory store in accordance with a preset priority scheme for each peripheral device requiring service when the process has been interrupted;

said instruction decode unit responsive to the interrupt signal to decode the instruction signal received from said memory store in response to the address signal and generating a second of said plurality of command signals to transfer data signals to said port register and generating the first command signal to selectively activate the input/output ports to transfer the data information from the port register to the peripheral device;

a working register connected to store a portion of the instruction signal from said memory store; and means connected to receive data signals from said memory store and to receive the portion of the instruction signal from said working register, said means performing an AND logical function on the data and instruction signals in response to a fourth of said plurality of command signals to generate a resultant signal;

said resultant signal being directed to said port register to transmit said resultant signal from the input/output ports activated by said first command signal for transmission as data signals to the peripheral device, and instruction decode unit generating said first and fifth command signals to activate or deactivate certain of said bidirectional leads of said input/output ports according to the resultant signal.

7. A data processing system as defined in claim 6 wherein said controller further includes a counter receiving a third of said plurality of command signals from said instruction decode unit in accordance with said address signal to load a count into said counter, said counter counting set time signal and generating a special interrupt signal to said interrupt address generator upon reaching a selected count, said interrupt address generator responsive to said special interrupt signal to generate an address signal.

8. A data processing system as defined in claim 7 wherein said counter is a decrementing counter and the special interrupt signal is generated when said counter reaches a count of zero.

9. A data processing system as defined in claim 6 wherein said means is an arithmetic and logic unit connected to receive data signals from the input/output ports activated by said first command signals, said arithmetic and logical unit in response to the fourth command signal performing the AND logical function on the data signals from said input/output ports in combination with the instruction signals from said working register to obtain a second resultant signal therefrom, wherein certain of the data signals are selectively activated or deactivated by said arithmetic and logical unit according to the instruction signal thereby effectively activating or deactivating certain of the bidirectional leads in the activated input/output ports, said second resultant signal being directed to a storage register for usage by the controller.

10. A data processing system as defined in claim 6 wherein said interrupt address generator of said controller further includes a means for selectively masking thereby disabling selected ones of said request signals to prevent the generation of an interrupt signal resulting from said masked request signals.

11. In a data processing system including a plurality of peripheral devices and a controller for providing a procedural adaptation stage for the peripheral devices and for receiving, processing and transmitting data signals to said peripheral devices, and controller comprising:

a memory store having addressable storage locations responsive to address signals for delivering data and instruction signals stored therein;

an instruction decode unit for decoding instruction signals received from said memory store upon activation and responsive thereto to issue a plurality of command signals;

a port unit including a plurality of input/output ports and a port register, each port having a plurality of bidirectional leads, selective groups of leads from one or more ports interconnecting said port register to each peripheral device, each of said plurality of input/output ports selectively activated by a first of said plurality of command signals to transfer data signals in said port register to the peripheral devices;

an interrupt address generator connected to said port unit to receive and detect request signals representative of request by the peripheral devices for access to the controller and responsive thereto to generate an interrupt signal for interrupting a process being performed by the controller and to generate an address signal to said memory store in accordance with a preset priority scheme for each peripheral device requiring service when the process has been interrupted;

a working register connected to store a portion of the instruction signal from said memory store; and an arithmetic and logical unit connected to receive data signals and to receive the portion of the instruction signal from said working register;

said instruction decode unit responsive to the interrupt signal to decode the instruction signal received from said memory store in response to the address signal and generating a second of said plurality of command signals to transfer data signals from said memory store and the instruction signals from said working register to said arithmetic and logical unit and to activate said arithmetic and logic unit to perform a logical function and thereby generate a resultant signal;

said resultant signal being directed to said port register to transmit said resultant signal from the input/output ports when activated by said first command signal for transmission as data signals to the peripheral devices, said instruction decode unit generating said first and second command signals to activate or deactivate certain of said bidirectional leads of said input/output ports according to the resultant signal;

said arithmetic and logical unit being connected to receive data signals from the input/output ports activated by said first command signals, said arithmetic and logical unit in response to the second command signal performing the logical function on the data signals from said input/output ports in combination with the instruction signals from said working register to obtain a second resultant signal therefrom, wherein certain of the data signals are selectively activated or deactivated by said arithmetic and logical unit according to the instruction signal thereby activating or deactivating certain of the bidirectional leads in the activated input/output ports, said second resultant signal being directed to a storage register for usage by the controller.

12. A data processing system as defined in claim 11 wherein said controller further includes a counter receiving a third of said plurality of command signals from said instruction decode unit in accordance with said address signal to load a count into said counter, said counter counting set time signal pulses and generating a special interrupt signal to said interrupt address generator upon reaching a selected count, said interrupt address generator responsive to said special interrupt signal to generate an address signal.

13. A data processing system as defined in claim 11 wherein said interrupt address generator of said controller further includes a means for selectively masking thereby disabling selected ones of said request signals to prevent the generation of an interrupt signal resulting from said masked request signals.

14. In a data processing system including a plurality of peripheral devices and a controller for providing a procedural adaptation stage for the peripheral devices and for receiving, processing and transmtting data signals to said peripheral devices, said controller comprising:

a memory store having addressable storage locations responsive to address signals for delivering data and instruction signals stored therein;

an instruction decode unit for decoding instruction signals from said memory store and responsive thereto to issue a plurality of command signals;

a port unit including a plurality of input/output ports, each port having a plurality of bidirectional leads, selective groups of leads from one or more ports interconnecting said port unit to each peripheral device, each of said plurality of input/output ports selectively activated by a first of said plurality of command signals to transmit data signals to the peripheral device and by a second of said plurality of command signals to accept data signals from the peripheral device;

an interrupt address generator connected to said port unit to receive and detect request signals representative of request by the peripheral devices for access to the controller and responsive thereto to generate an interrupt signal for interrupting a process being performed by the controller and to generate an address signal to said memory store in accordance with a preset priority scheme for each peripheral device requiring service when the process has been interrupted; said instruction decode unit responsive to the interrupt signal to decode the instruction signal from said memory store and generating the first or the second command signal according to the instruction to activate the number and specific input/output ports and whether to accept or transmit data signals;

a working register connected to store a portion of the instruction signal from said memory store; and means connected to receive the portion of the instruction signal from said working register and to receive data signals from said memory store or said port unit for performing a logic AND function on the data and instruction signals in response to a fourth of said plurality of command signals to generate a resultant signal;

said resultant signal being directed to said port unit to transmit said resultant signal from the input/output ports activated for transmission as data signals if the first command signal is enabled, said resultant signal being directed to a storage register if the second command signal is enabled, said instruction decode unit generating said first or second and said fourth command signals to activate or deactivate the data signal on certain of said bidirectional leads of said input/output ports to obtain the resultant signal.

15. A data processing system as defined in claim 14 wherein said controller further includes a counter receiving a third of said plurality of command signals from said instruction decode unit in accordance with said address signal to load a count into said counter, said counter counting set time signal pulses and generating a special interrupt signal to said interrupt address generator upon reaching a selected count, said interrupt address generator responsive to said special interrupt signal to generate an address signal.

16. A data processing system as defined in claim 14 wherein said interrupt address generator of said controller further includes a means for selectively masking thereby disabling selected ones of said request signals to prevent the generation of an interrupt signal resulting from said masked request signals.

* * * * *